United States Patent
Cao et al.

(10) Patent No.: US 11,972,497 B2
(45) Date of Patent: Apr. 30, 2024

(54) ELECTRIC ENERGY METER AND METERING DEVICE THEREOF

(71) Applicant: HANGZHOU VANGO TECHNOLOGIES, INC., Hangzhou (CN)

(72) Inventors: Jie Cao, Hangzhou (CN); Jie He, Hangzhou (CN); Aijun Wang, Hangzhou (CN); Zhaosheng Du, Hangzhou (CN); Xiaohui Xiao, Hangzhou (CN)

(73) Assignee: HANGZHOU VANGO TECHNOLOGIES, INC., Hangzhou (CN)

( * ) Notice: Subject to any disclaimer, the term of this patent is extended or adjusted under 35 U.S.C. 154(b) by 444 days.

(21) Appl. No.: 17/512,657

(22) Filed: Oct. 27, 2021

(65) Prior Publication Data
US 2022/0051354 A1    Feb. 17, 2022

(30) Foreign Application Priority Data
Apr. 9, 2021 (CN) .......................... 202110382556.1

(51) Int. Cl.
*H02B 1/03* (2006.01)
*G06Q 50/06* (2012.01)

(52) U.S. Cl.
CPC .............. *G06Q 50/06* (2013.01); *H02B 1/03* (2013.01)

(58) Field of Classification Search
CPC .................................. H02B 1/03; G06Q 50/06
See application file for complete search history.

(56) References Cited

U.S. PATENT DOCUMENTS

| | | | |
|---|---|---|---|
| 7,065,457 B1 * | 6/2006 | Germer | G01R 21/133 324/142 |
| 2003/0105608 A1 * | 6/2003 | Hart | H02H 1/0061 702/122 |
| 2008/0155135 A1 * | 6/2008 | Garg | G06F 13/126 712/34 |
| 2014/0005853 A1 * | 1/2014 | Chen | G01R 22/10 700/298 |
| 2018/0103302 A1 * | 4/2018 | Bell | G06N 20/20 |
| 2020/0026318 A1 * | 1/2020 | Forbes, Jr. | H02J 13/00001 |

* cited by examiner

*Primary Examiner* — Mohammad Ali
*Assistant Examiner* — Vincent W Chang
(74) *Attorney, Agent, or Firm* — JCIP GLOBAL INC.

(57) ABSTRACT

The present application discloses a metering device, including a structure body of the metering device, a first metering chip and a metering master control chip. The first metering chip is configured for performing fundamental wave and full wave processing on electric energy data; the metering master control chip includes a master control chip core, a coprocessor and a storage unit, wherein the master control chip core and the coprocessor share the storage unit; and the coprocessor is configured for performing harmonic processing on the electric energy data based on the storage unit and based on a manner of instruction. By applying the solution of the present application, the electric energy data of the metering device can be processed quickly and efficiently, and a hardware cost is saved at the same time. The present application also provides an electric energy meter which has the corresponding technical effects.

14 Claims, 3 Drawing Sheets

ELECTRIC ENERGY METER AND METERING DEVICE THEREOF

CROSS-REFERENCE TO RELATED APPLICATION

This application claims the priority benefit of China application serial no. 202110382556.1, filed on Apr. 9, 2021. The entirety of the above-mentioned patent application is hereby incorporated by reference herein and made a part of this specification.

BACKGROUND

Technical Field

The present invention relates to the field of electric power technologies, and more particularly, to an electric energy meter and a metering device thereof.

Description of Related Art

With the development of smart power grids, harmonic pollution of power systems is becoming more and more serious. In the technical specification of new generation smart electric energy meters, it is required to provide not only the traditional metering and measurement data of full wave and fundamental wave, but also the related data including an electric energy quality and a running status of the electric meter. It is necessary to realize the functions of harmonic analysis and harmonic metering, accurately analyze a frequency, an amplitude and a phase of the harmonic, and quickly and effectively detect and analyze harmonic components in the power grid to reduce the harmonic pollution of the power grid, thus helping to make a better power distribution decision.

In the current solution, only software is used by a metering master control chip to directly process the electric energy data uploaded by sampling, and the amplitude and the phase of the harmonic component of each order are obtained by FFT (Fast Fourier Transform). To effectively monitor and analyze the harmonic component in the power grid, it is necessary to obtain the information such as active and reactive power, RMS (root mean square values) of voltage and current, harmonic ratio and a total harmonic distortion rate of the harmonic component. An arithmetic operation is as follows:

A complex representation form of the harmonic component information in FFT is as follows:

$$\dot{U}_k = X_u\left(\frac{kf_0}{f_s/N}\right) = a_k + jb_k$$

$$\dot{I}_k = X_i\left(\frac{kf_0}{f_s/N}\right) = c_k + jd_k$$

Wherein, k represents different harmonic components, k=1 represents the fundamental wave, U represents the voltage, I represents the current, a represents real part information, and b represents imaginary part information. According to the real part and imaginary part information of each fractional voltage and current harmonic component, the following results can be calculated:

RMS of the voltage and the current of each harmonic component:

$$U_k = g\sqrt{a_k^2 + b_k^2}$$

$$I_k = g\sqrt{c_k^2 + d_k^2}$$

Active and reactive power of each harmonic component:
$P_k = g^2(a_k c_k + b_k d_k)$; $Q_k = g^2(b_k c_k - a_k d_k)$ Voltage and current harmonic ratio of each harmonic component:

$$HRU_k = \frac{U_k}{U_1} \times 100(\%)$$

$$HRI_k = \frac{I_k}{I_1} \times 100(\%)$$

Total harmonic distortion rate:

$$THD_U = \frac{\sqrt{\sum_{h=2}^{Max}(U_k)^2}}{U_1} \times 100(\%)$$

$$THD_I = \frac{\sqrt{\sum_{k=2}^{Max}(I_k)^2}}{I_1} \times 100(\%)$$

FFT analysis needs to provide a whole cycle of sampling data. For a power grid signal frequency of 50 hz, FFT results need to be updated every short cycle. The current solution is that the metering master control chip directly uses software in a core to complete a corresponding processing operation, which will always occupy running resources of the core and affect the master control chip to perform other application functions. Meanwhile, arithmetic processing needs a large amount of memory access, and has a large amount of calculation consumption, which will consume too much time for the processing of multi-data, such as data processing after FFT of 21 harmonics, and cannot meet the real-time requirements of processing the metering data.

To sum up, how to process the power data quickly and efficiently is an urgent technical problem to be solved by those skilled in the field.

SUMMARY

An objective of the present invention is to provide an electric energy meter and a metering device thereof so as to quickly and efficiently process electric energy data of the metering device.

In order to solve the foregoing technical problems, the present invention provides the following technical solutions.

A metering device includes a structure body of the metering device, a first metering chip and a metering master control chip, wherein: the first metering chip is configured for performing fundamental wave and full wave processing on electric energy data; the metering master control chip includes a master control chip core, a coprocessor and a storage unit, wherein the master control chip core and the coprocessor share the storage unit; and the coprocessor is configured for performing harmonic processing on the electric energy data based on the storage unit and based on a manner of instruction.

Preferably, the coprocessor is specifically configured for: in a single-phase mode, based on the storage unit, performing N harmonic processing of single phase on the electric energy data by multiplexing a target instruction set for N times; and in a three-phase mode, based on the storage unit, performing N harmonic processing of each phase on the electric energy data by multiplexing the target instruction set for 3N times; wherein, N is a positive integer.

Preferably, the coprocessor includes: an instruction controller configured for acquiring an instruction from the target instruction set of the storage unit through an instruction bus according to a preset instruction jump rule; an instruction decoding executor configured for parsing the instruction sent by the instruction controller and executing the instruction, and when executing data acquisition, based on a current mode and a current value of a counter register, acquiring data information of a currently needed target subharmonic from the storage unit through a data bus and based on a virtual remapping manner and storing the data information in a general purpose register; the general purpose register configured for performing data interaction with the storage unit and with a basic arithmetic logic unit; and the basic arithmetic logic unit configured for performing a logical operation on the data stored in the general-purpose register according to an arithmetic command sent by the instruction decoding executor, so that the coprocessor realizes the harmonic processing on the electric energy data.

Preferably, the coprocessor further includes: a configuration data register configured for adjusting configuration information of the coprocessor.

Preferably, the storage unit includes a RAM and a flash memory, and the target instruction set is stored in the flash memory.

Preferably, the storage unit includes: an instruction space area for storing the target instruction set; a to-be-processed data area for processing to-be-processed source data; an arithmetic data area for storing an arithmetic intermediate value and an arithmetic result; and a correction parameter area for storing a correction parameter.

Preferably, the storage unit further includes: an interactive data register area for storing target data in the arithmetic result.

Preferably, the arithmetic data area includes a mapping area and a non-mapping area, the mapping area is configured for storing all subharmonic correlation quantities in the arithmetic intermediate value and the arithmetic result, and the non-mapping area is configured for storing all non-subharmonic correlation quantities in the arithmetic intermediate value and the arithmetic result.

An electric energy meter includes any one of the metering devices described above.

According to the technical solutions provided by the embodiments of the present invention, the first metering chip only needs to perform the fundamental wave and full wave processing on the electric energy data. In this application, the coprocessor is specially arranged in the metering master control chip, and the coprocessor performs the harmonic processing on the electric energy data, so that the resources of the first metering chip will not be occupied. In addition, the coprocessor performs the harmonic processing on the electric energy data based on the storage unit and based on the manner of instruction, which can effectively guarantee the high efficiency of the harmonic processing on the electric energy data. Meanwhile, the master control chip core and the coprocessor share the storage unit, that is, the coprocessor is arranged in the metering master control chip in this application, and no additional storage unit is required for the coprocessor, which is beneficial to saving the hardware cost of this solution. To sum up, the solution of the present application can quickly and efficiently process the electric energy data of the metering device and save the hardware cost at the same time.

BRIEF DESCRIPTION OF THE DRAWINGS

In order to illustrate the technical solutions in the embodiments of the present invention or in the prior art more clearly, the drawings used in the description of the embodiments or the prior art will be briefly described below. Obviously, the drawings in the following description are merely some embodiments of the present invention. For those of ordinary skills in the art, other drawings may also be obtained based on these drawings without going through any creative work.

DETAILED DESCRIPTION OF DISCLOSED EMBODIMENTS

Figure 1:
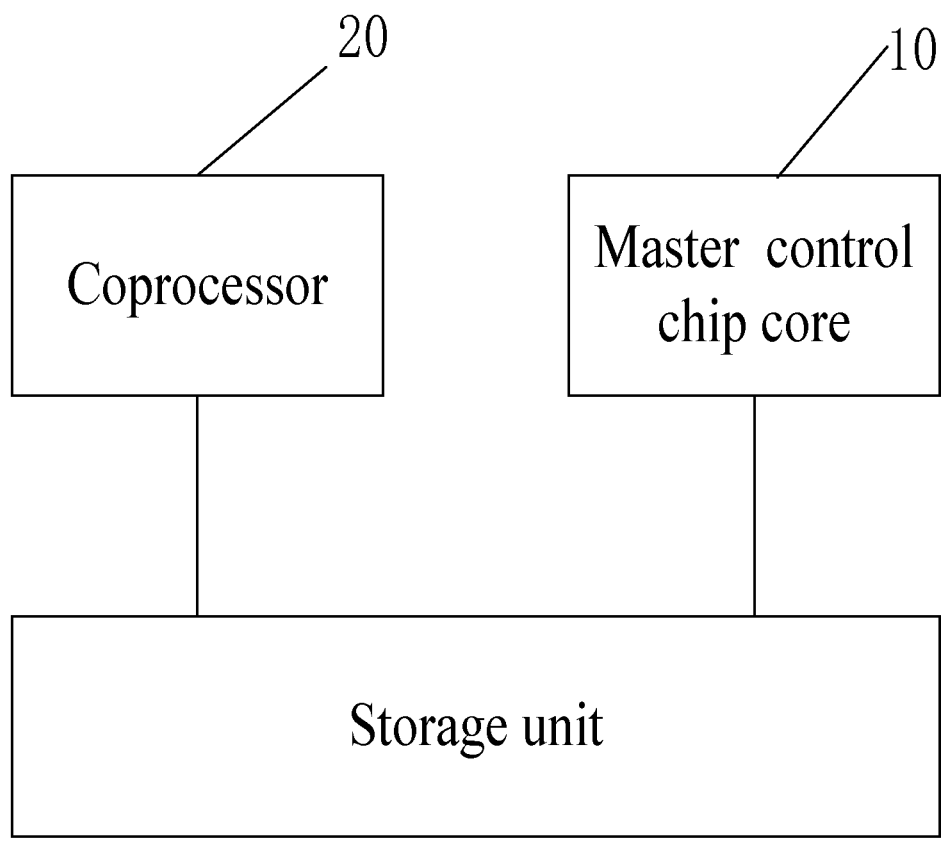
FIG. 1 is a schematic structure diagram of a metering master control chip according to the present invention.

In order for the objectives, technical solutions, and advantages of the disclosure to be clearer, the following further describes the disclosure in detail with reference to the accompanying drawings and embodiments. It should be understood that the specific embodiments described here are only used to explain the disclosure, but not to limit the disclosure. In addition, the technical features involved in the various embodiments of the disclosure described below may be combined with each other as long as there is no conflict therebetween.

The core of the present invention is to provide a metering device, which can quickly and efficiently process electric energy data of the metering device, and is beneficial for saving a cost.

To enable those skilled in the art to better understand the solutions of present invention, the present invention will be further described in detail below with reference to the drawings and embodiments. Obviously, the embodiments described are merely a part of, rather than all of, the embodiments of the present invention. Based on the embodiments of the present invention, all other embodiments obtained by those of ordinary skills in the art without going through any creative work shall fall within the protection scope of the present invention.

The metering device according to the present application may include a structure body of the metering device, a first metering chip and a metering master control chip.

The first metering chip is configured for performing fundamental wave and full wave processing on electric energy data.

The metering master control chip includes a master control chip core, a coprocessor and a storage unit, wherein the master control chip core and the coprocessor share the storage unit.

The coprocessor is configured for performing harmonic processing on the electric energy data based on the storage unit and based on a manner of instruction.

Specifically, the structure body of the metering device represents structures of other devices except the first metering chip and the metering master control chip in the metering device, which specifically depends on a specific structural design of the metering device in practical application and may be set according to actual needs, and will not be described here.

The first metering chip may perform fundamental wave and full wave processing on the electric energy data, and the specific type and structure of the first metering chip may be set according to actual needs. Certainly, in other occasions, the first metering chip may also complete other tasks, which may be set and adjusted according to actual needs without affecting the implementation of the present invention.

The metering master control chip is mainly configured for performing harmonic processing on the electric energy data. In some traditional solutions, the harmonic processing on the electric energy data is realized based on software, which is inefficient and takes up a lot of resources. In the solution of the present application, the coprocessor specially configured for performing harmonic processing on the electric energy data is arranged in the metering master control chip.

Please refer to FIG. 1, which is a structural schematic diagram of a metering master control chip according to an embodiment of the present invention. The metering master control chip includes a master control chip core 10, a coprocessor 20 and a storage unit 30.

In FIG. 1, the storage unit 30 may be composed of one or more different types of storage, and is a main storage space in the metering master control chip. Moreover, the master control chip core 10 and the coprocessor 20 share the storage unit 30. That is to say, in the solution of the present application, it is not necessary to additionally configure a storage unit 30 for the coprocessor 20, and the original design of the storage unit 30 of the metering master control chip can be directly adopted, which reduces a hardware cost of the solution of the present application.

The master control chip core 10 may perform data interaction with the coprocessor 20, and can realize functions such as parameter configuration, data allocation and reading for the coprocessor 20. Certainly, other functions in the metering master control chip except the harmonic processing on the electric energy data can also be set to be realized by the master control chip core 10 by means of carrying out corresponding programming in the master control chip core 10 according to actual needs.

The coprocessor 20 specially set up in the present application is configured for performing harmonic processing on the electric energy data, so as not to occupy resources of the master control chip core 10, and the coprocessor 20 performs harmonic processing on the electric energy data based on a manner of instruction, so as to efficiently process the harmonics of the electric energy data. Specifically, a DSP coprocessor 20 may be selected.

Further, it is considered in the present application that, when harmonic processing is performed, a large amount of storage space for source data and storage space for calculation results are needed. Although the data of each subharmonic is different, arithmetic steps are the same. For three phases, the arithmetic steps of each phase are the same, but the data of different phases are different. Therefore, the coprocessor 20 can realize the harmonic processing on the electric energy data by means of instruction multiplexing, which is beneficial to reducing a number of instructions needed and also beneficial to reducing the storage space needed by the solution of the present application.

In a specific embodiment of the present invention, the coprocessor 20 may be specifically configured for: in a single-phase mode, based on the storage unit 30, performing N harmonic processing of single phase on the electric energy data by multiplexing a target instruction set for N times; and in a three-phase mode, based on the storage unit 30, performing N harmonic processing of each phase on the electric energy data by multiplexing the target instruction set for 3N times; wherein, N is a positive integer.

In this embodiment, through instruction multiplexing, the instruction storage space and the number of instructions needed by the solution can be reduced. Moreover, this embodiment supports the single-phase mode and the three-phase mode, which can be freely selected according to actual needs, so that a flexibility of the solution is improved.

In addition, it should also be pointed out that instruction multiplexing refers to those instructions that need to be used in the harmonic operation of each order. Taking the single-phase mode as an example, for example, when calculating voltage/current RMS of the harmonic component of each order of a certain phase, relevant instructions need to be multiplexed for N times, while when calculating a total harmonic distortion rate of a certain phase, for example, relevant instructions only need to be used once in one calculation cycle. That is to say, multiplexing the target instruction set for N times does not mean that all the instructions will be multiplexed for N times, but that the instructions needed for the harmonic operation of each order will be multiplexed for N times, and there are a few other instructions, such as an instruction related to calculating the total harmonic distortion rate, a start instruction, an end condition judgment instruction, etc., which need not be multiplexed for N times.

Figure 2:
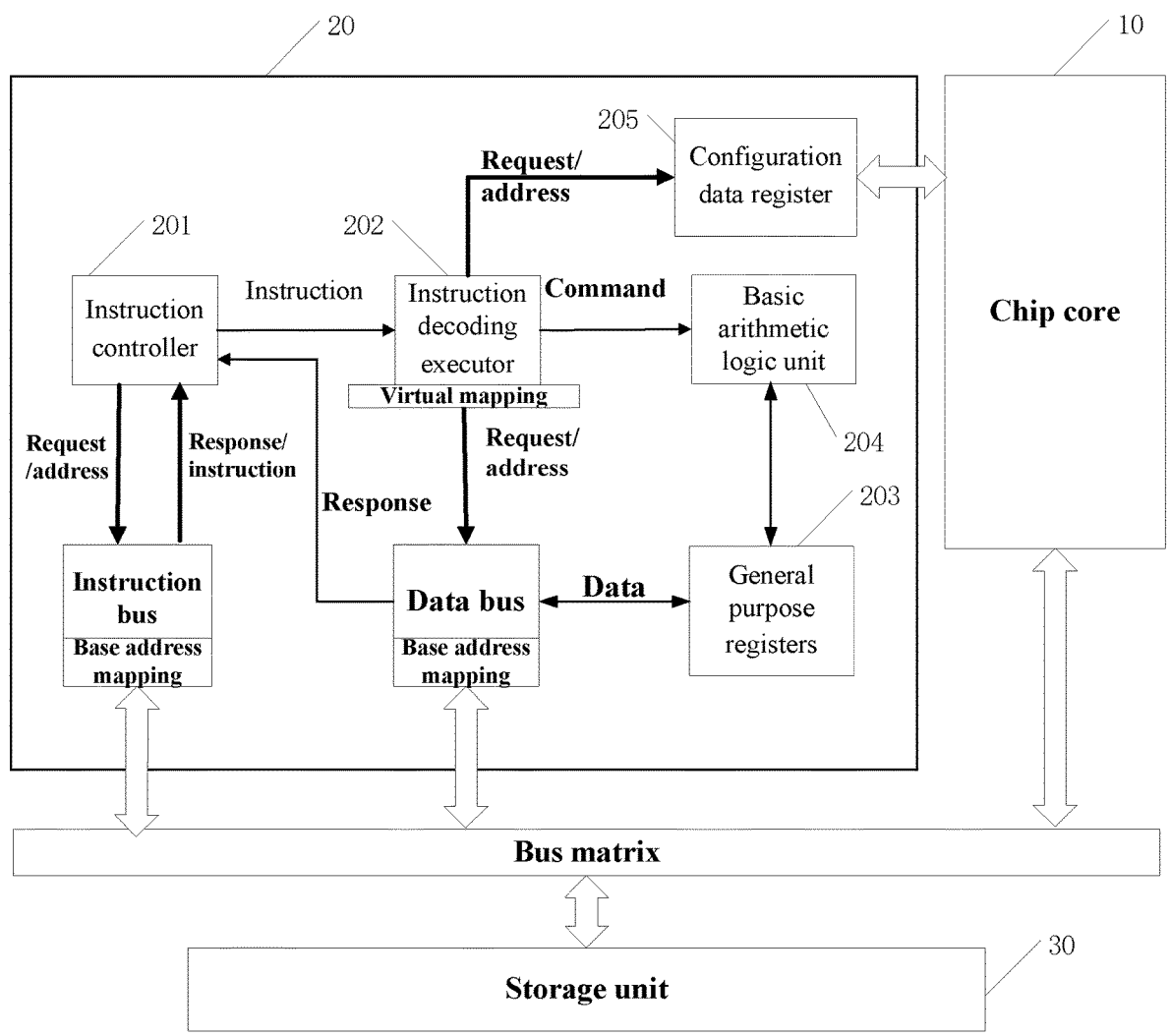
FIG. 2 is a schematic structural diagram of a metering master control chip according to an embodiment of the present invention.

Please refer to FIG. 2. In a specific embodiment of the present invention, the coprocessor 20 includes: an instruction controller 201 configured for acquiring an instruction from the target instruction set of the storage unit 30 through an instruction bus according to a preset instruction jump rule; an instruction decoding executor 202 configured for parsing the instruction sent by the instruction controller 201 and executing the instruction, and when executing data acquisition, based on a current mode and a current value of a counter register, acquiring data information of a currently needed target subharmonic from the storage unit 30 through a data bus and based on a virtual remapping manner and storing the data information in a general purpose register 203; the general-purpose register 203 configured for performing data interaction with the storage unit 30 and with a basic arithmetic logic unit 204; and the basic arithmetic logic unit 204 configured for performing a logical operation on the data stored in the general-purpose register 203 according to an arithmetic command sent by the instruction decoding executor 202, so that the coprocessor 20 realizes the harmonic processing on the electric energy data.

Figure 3:
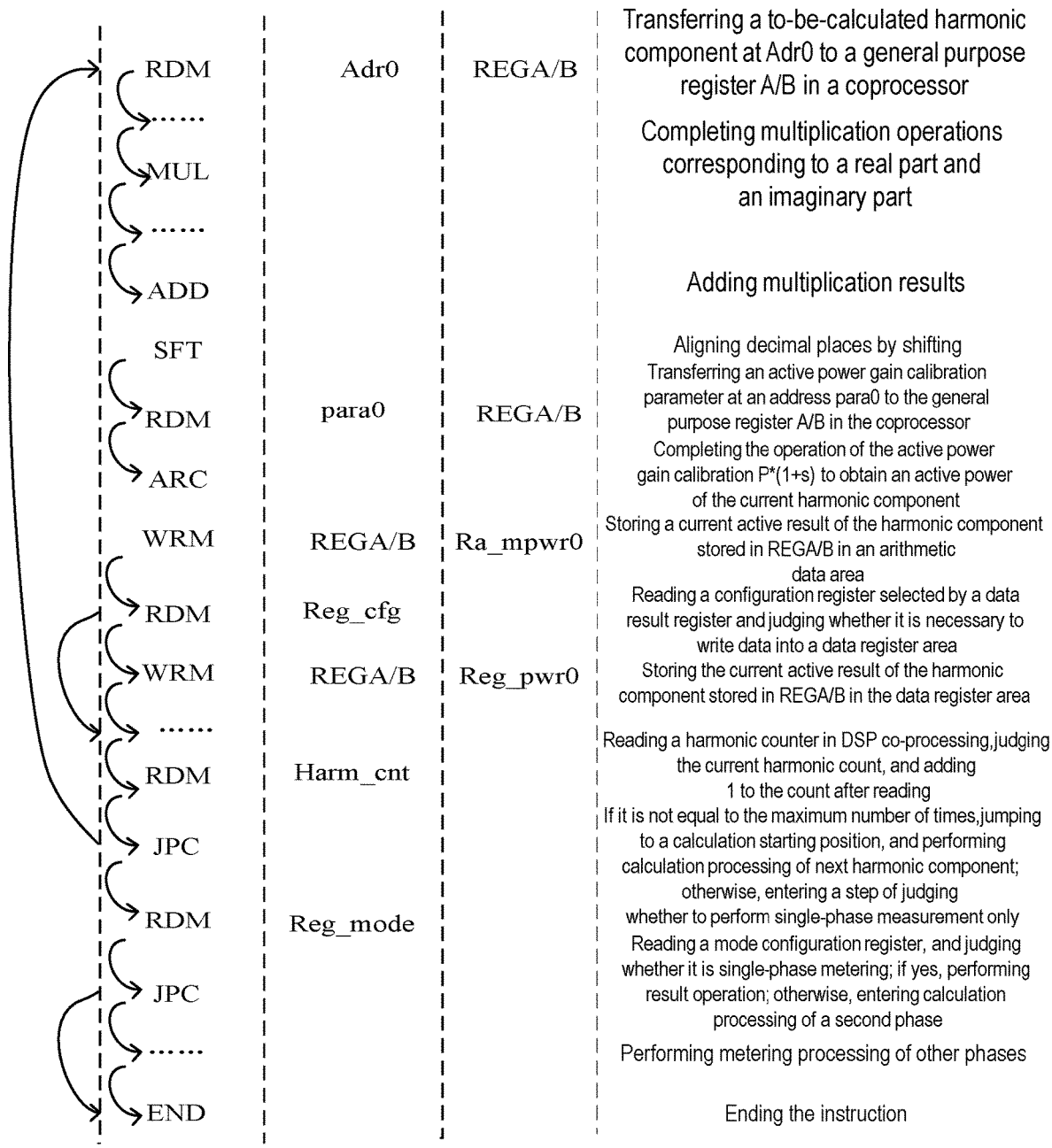
FIG. 3 is a schematic diagram of instruction jump in an occasion of the present invention.

For easy understanding, the calculation process of the active power of the harmonic component of each order may be taken as an example. FIG. 3 is a schematic diagram of instruction jump of the example.

Starting from the second harmonic, the instruction controller 201 first acquires a loading instruction from the target instruction set of the storage unit 30 through the instruction bus according to the preset instruction jump rule, and the loading instruction is parsed and executed by the instruction decoding executor 202.

The instruction controller 201 may read instructions and may perform jump control over a read address, thus realizing instruction jump. After the coprocessor 20 is started, the instruction controller 201 may initiate a corresponding instruction read request based on the address, and may receive a designated read response and a data execution response sent by the data bus. The instruction controller 201 may execute each instruction according to the preset instruction jump rule, including sequential execution and jump execution. The jump execution specifically includes conditional jump and direct jump, and the jump operation can be realized by read address jump. When running to the end instruction, the instruction controller 201 may generate an end indication signal.

The instruction decoding executor 202 parses and executes the loading instruction. Specifically, the loading instruction may be executed based on the current mode and the current value of the counter register. For example, if the current value of the counter register is 2 in the single-phase mode of a phase A at present, data information of a second harmonic of a voltage and a current of the phase A is acquired from the storage unit 30 through the data bus and stored in the general purpose register 203.

The instruction decoding executor 202 is configured for decoding and executing instructions, and may include decoding of special instruction sets, so as to generate corresponding operation behaviors, including data transfer between the storage unit 30 and the general purpose register 203, an operation instruction for the basic arithmetic logic unit 204, and may also include operations such as data shifting, instruction jump command and running status updating.

In addition, it should be emphasized that due to the need of instruction multipexing, that is, each subharmonic has the same arithmetic steps but different data, and the arithmetic steps of each phase are the same but the data of different phases are different. In this embodiment, different data acquisition is realized based on the current mode and the current value of the counter register and based on the virtual remapping manner. For example, in this occasion, based on virtual remapping, the data information of the second harmonic of the voltage and the current of the phase A may be obtained from the storage unit 30, while the loading instruction received by the instruction decoding executor 202 is the same when calculating the third harmonic of the phase A, but based on virtual remapping, the data information of the third harmonic of the voltage and the current of the phase A can be acquired from the storage unit 30.

The data information of the second harmonic of the voltage and the current of the phase A is acquired from the storage unit 30 through the data bus, and stored in the general purpose register 203, and then needed multiplication and addition operations are completed through subsequent instructions, and decimal places of the arithmetic results are adjusted by shifting.

After that, the needed correction parameter is read. Similarly, this operation needs virtual remapping to obtain a corrected value of the second harmonic, so as to perform a gain and offset calibration operation with the active power calculated previously, and save the result in the storage unit 30. Furthermore, it should be noted that saving the result in the storage unit 30 also needs to save the result in a corresponding area of the active power of the second harmonic component through virtual remapping. Moreover, the current result will be accumulated to a total harmonic power, and the harmonic power may also be stored in a corresponding area of the storage unit 30.

After the active power of the second harmonic of the phase A is completely calculated, the value of the counter register may be adjusted according to a preset rule, for example, adding the value of the counter register by 1, and jumping back to an starting operation instruction, so as to calculate an active power of the third harmonic through instruction multiplexing according to the above-mentioned flow, and so on, until the calculation of the highest-order harmonic component, i.e. the Nth harmonic component, is completed, if it is the single-phase mode, the flow may jump to the end; if it is the three-phase mode, phase B and a phase C may be operated according to the flow above.

In the specific solution of FIG. 2, both the master control chip core 10 and the coprocessor 20 access the storage unit 30 through a bus matrix. The bus matrix is a part of a bus architecture of the metering master control chip. The coprocessor 20 acts as both a slave of the master control chip core 10 and a main module on the bus matrix, and arbitrates an access request through the bus matrix and issues a bus command to access the storage unit 30 in the system.

In a specific embodiment of the present invention, the storage unit 30 may include an RAM and a flash memory, and the target instruction set is stored in the flash memory, which is beneficial for users to develop.

The basic arithmetic logic unit 204 may be controlled by the instruction decoding executor 202, and may complete the basic logic operations corresponding to the instruction set, including shift, addition, subtraction, multiplication and division, square root and combined operation.

The general purpose register 203 may be set according to needs, for example, it is set to have two general purpose register sets inside, which buffer the data and the operation result obtained from the storage unit 30, and serve as input and output data space of the basic arithmetic logic unit 204, and can only be accessed by the coprocessor 20 and controlled by instructions, so as to realize data interaction with the storage unit 30 and the basic arithmetic logic unit 204.

In a specific embodiment of the present invention, the storage unit 30 may include: an instruction space area for storing the target instruction set; a to-be-processed data area for processing to-be-processed source data; an arithmetic data area for storing an arithmetic intermediate value and an arithmetic result; and a correction parameter area for storing a correction parameter.

In this embodiment, the storage unit 30 at least includes the instruction space area, the to-be-processed data area, the arithmetic data area and the correction parameter area, which is convenient for dividing different data. Certainly, in other embodiments, there may be other dividing modes.

The instruction space area is configured for storing the target instruction set. Specifically, the target instruction set may be mapped to the flash memory or the RAM space of the storage unit 30 based on the instruction base address mapping. After the coprocessor 20 is started, the instructions can be automatically read from the instruction space area.

The to-be-processed data area is configured for storing the to-be-processed source data: the data may be mapped to the flash memory or RAM space of the storage unit 30 based on base address mapping of the to-be-processed data area, and the coprocessor 20 is designated to read the source data to be processed by arithmetic operation, such as the real part and imaginary part information of the harmonic components stored after FFT.

The arithmetic data area is configured for storing the arithmetic intermediate value and the arithmetic result. Specifically, the arithmetic intermediate value and the arithmetic result may be mapped to the flash memory or the RAM space of the storage unit 30 based on base address mapping of the arithmetic data area. The arithmetic data area can cache the arithmetic intermediate value and store the final arithmetic result.

Further, in a specific embodiment of the present invention, the arithmetic data area may include a mapping area and a non-mapping area, the mapping area is configured for storing all subharmonic correlation quantities in the arithmetic intermediate value and the arithmetic result, and the non-mapping area is configured for storing all non-subharmonic correlation quantities in the arithmetic intermediate value and the arithmetic result.

For example, in the aforementioned embodiments, the subharmonic correlation quantities such as the active power of the second harmonic and the active power of the third harmonic may be placed in the mapping area of the arithmetic data area, while the non-subharmonic correlation quantities such as the total harmonic power may be placed in the non-mapping area of the arithmetic data area, so that different types of data can be divided more finely.

The correction parameter area is configured for storing the correction parameter, which may include internal adjustment correction parameters of the power and the RMS calculated of each subharmonic.

Moreover, it should be noted that, similar to the arithmetic data area, other areas may also be provided with a mapping area and a non-mapping area, which does not affect the implementation of the present invention. For example, considering that the data in the correction parameter area are all subharmonic correlation quantities, a subharmonic mapping address may be fixedly employed for the correction parameter area, that is, the correction parameter areas are all mapping areas. For another example, the to-be-processed data area may be divided into a mapping area and a non-mapping area, and the non-mapping area is used as subsequent function extension to improve a flexibility of the solution. During actual application, the same kind of data of different harmonic components in the mapping area may be continuously arranged, and only the same address is accessed for instructions. The actually accessed address is a specific position located to each harmonic component through virtual remapping according to the current mode and the value of the counter register.

Different areas have different base addresses which may be adjusted according to needs. The coprocessor 20 can locate different areas through base address mapping. To obtain specific data of a certain area, the coprocessor 20 can locate the area by virtual address remapping. In the embodiment of FIG. 2, the virtual address remapping is realized by the instruction decoding executor 202 of the coprocessor 20. It should be noted that the access of each area can have an independent remapping relationship according to address attributes, which may be controlled by a software configuration register, or remapping conditions may be set according to instructions. For each harmonic processing, the same instruction is used, and the specific address remapping can be completed according to the current mode and the value of the counting register. For each subharmonic processing, the same instruction is used, and the specific address remapping can be completed according to the current mode and the value of the counter register.

In a specific embodiment of the present invention, the storage unit 30 may also include: an interactive data register area for storing target data in the arithmetic result.

The interactive data register area can store the target data in the arithmetic result, so as to facilitate rapid reading of the target data during subsequent metering, for example, rapid reading of power/RMS required in energy statistics. The interactive data register area is different from an RAM memory, and a large number of registers will bring more logical area consumption. Therefore, to quickly interact with other metering related modules without a large amount of area consumption, in practical application, a small number of data registers will be set as interactive data register areas to store specific target data, so as to quickly interact with other metering related modules.

In a specific embodiment of the present invention, the coprocessor 20 may also include: a configuration data register 205 configured for adjusting configuration information of the coprocessor 20. To be specific, the configuration data register 205 may be connected with a main controller, so that a user can set and adjust the configuration data register, so as to adjust configuration information of the coprocessor 20. For example, the configuration data register 205 may specifically include configuration information such as changing control, mode, memory access base address, mapping area boundary address and mapping configuration of the coprocessor 20, and can also obtain a running status of the coprocessor 20.

According to the technical solutions provided by the embodiments of the present invention, the first metering chip only needs to perform the fundamental wave and full wave processing on the electric energy data. In this application, the coprocessor is specially arranged in the metering master control chip, and the coprocessor performs the harmonic processing on the electric energy data, so that the resources of the first metering chip will not be occupied. In addition, the coprocessor performs the harmonic processing on the electric energy data based on the storage unit and based on the manner of instruction, which can effectively guarantee the high efficiency of the harmonic processing on the electric energy data. Meanwhile, the master control chip core and the coprocessor share the storage unit, that is, the coprocessor is arranged in the metering master control chip in this application, and no additional storage unit is required for the coprocessor, which is beneficial to saving the hardware cost of this solution. To sum up, the solution of the present application can quickly and efficiently process the electric energy data of the metering device and save the hardware cost at the same time.

Corresponding to the above embodiments, the embodiments of the present invention also provide an electric energy meter, which may include the metering device in any of the above embodiments. The electric energy meter can refer to the above, and will not be repeated here.

It should also be noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, a method, an article, or a device including a series of elements, includes not only those elements but also includes other elements not expressly listed, or also includes elements inherent to such process, method, article, or device. In the absence of further limitation, an element defined by the phrase "including a ... " does not exclude the presence of the same element in the process, method, article, or device.

Those skilled in the art may further realize that the units and algorithm steps of each example described in connection with the embodiments disclosed herein can be implemented in electronic hardware, computer software or a combination of the two. To clearly explain the interchangeability of hardware and software, the components and steps of each example have been generally described according to functions in the above description. Whether the functions are executed by hardware or software depends on particular applications and design constraint conditions of the technical solutions. Those skilled in the art may use different methods to implement the described functions for each particular application, but it should not be considered that the implementation goes beyond the scope of the present invention.

Specific examples are used herein to illustrate the principles and embodiments of the present invention. The description of the above embodiments is only used to help understand the technical solutions and core ideas of the present invention. It should be pointed out that for those of ordinary skills in the art, several improvements and modifications can be made to the present invention without departing from the principle of the present invention, and these improvements and modifications also fall within the protection scope of the claims of the present invention.

What is claimed is:

1. A metering device, comprising: a structure body of the metering device, a first metering chip and a metering master control chip, wherein:
    the first metering chip is configured for performing fundamental wave and full wave processing on electric energy data;
    the metering master control chip comprises a master control chip core, a coprocessor and a storage unit, wherein the master control chip core and the coprocessor share the storage unit; and
    the coprocessor is configured for performing harmonic processing on the electric energy data based on the storage unit and based on a manner of instruction,
    wherein the coprocessor is specifically configured for:
    in a single-phase mode, based on the storage unit, performing N harmonic processing of single phase on the electric energy data by multiplexing a target instruction set for N times; and
    in a three-phase mode, based on the storage unit, performing N harmonic processing of each phase on the electric energy data by multiplexing the target instruction set for 3N times; wherein, N is a positive integer.

2. The metering device according to claim 1, wherein the coprocessor comprises:
    an instruction controller configured for acquiring an instruction from the target instruction set of the storage unit through an instruction bus according to a preset instruction jump rule;
    an instruction decoding executor configured for parsing the instruction sent by the instruction controller and executing the instruction, and when executing data acquisition, based on a current mode and a current value of a counter register, acquiring data information of a currently needed harmonic of a target order from the storage unit through a data bus and based on a virtual remapping manner and storing the data information in a general purpose register;
    the general-purpose register configured for performing data interaction with the storage unit and with a basic arithmetic logic unit; and
    the basic arithmetic logic unit configured for performing a logical operation on the data stored in the general-purpose register according to an arithmetic command sent by the instruction decoding executor, so that the coprocessor realizes the harmonic processing on the electric energy data.

3. The metering device according to claim 2, wherein the coprocessor further comprises:
    a configuration data register configured for adjusting configuration information of the coprocessor.

4. The metering device according to claim 1, wherein the storage unit comprises an RAM and a flash memory, and the target instruction set is stored in the flash memory.

5. The metering device according to claim 1, wherein the storage unit comprises:
    an instruction space area for storing the target instruction set;
    a to-be-processed data area for processing to-be-processed source data;
    an arithmetic data area for storing an arithmetic intermediate value and an arithmetic result; and
    a correction para meter area for storing a correction parameter.

6. The metering device according to claim 5, wherein the storage unit further comprises:
    an interactive data register area for storing target data in the arithmetic result.

7. The metering device according to claim 5, wherein the arithmetic data area comprises a mapping area and a non-mapping area, the mapping area is configured for storing all subharmonic correlation quantities in the arithmetic intermediate value and the arithmetic result, and the non-mapping area is configured for storing all non-subharmonic correlation quantities in the arithmetic intermediate value and the arithmetic result.

8. An electric energy meter, comprising the metering device according to claim 1.

9. An electric energy meter, comprising the metering device according to claim 2.

10. An electric energy meter, comprising the metering device according to claim 3.

11. An electric energy meter, comprising the metering device according to claim 4.

12. An electric energy meter, comprising the metering device according to claim 5.

13. An electric energy meter, comprising the metering device according to claim 6.

14. An electric energy meter, comprising the metering device according to claim 7.

* * * * *